(12) United States Patent
Laroche et al.

(10) Patent No.: US 11,051,037 B2
(45) Date of Patent: Jun. 29, 2021

(54) METHOD AND APPARATUS FOR VECTOR ENCODING IN VIDEO CODING AND DECODING

(71) Applicant: CANON KABUSHIKI KAISHA, Tokyo (JP)

(72) Inventors: Guillaume Laroche, La Basse Romerais (FR); Christophe Gisquet, Rue du Martin Pêcheur (FR); Patrice Onno, Allée Georges Palante (FR)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 15/516,856

(22) PCT Filed: Oct. 6, 2015

(86) PCT No.: PCT/EP2015/073060
§ 371 (c)(1),
(2) Date: Apr. 4, 2017

(87) PCT Pub. No.: WO2016/055484
PCT Pub. Date: Apr. 14, 2016

(65) Prior Publication Data
US 2018/0302645 A1 Oct. 18, 2018

(30) Foreign Application Priority Data
Oct. 6, 2014 (GB) .................................... 1417634

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/105* (2014.11); *H04N 19/156* (2014.11);
(Continued)

(58) Field of Classification Search
None
See application file for complete search history.

(56) References Cited

U.S. PATENT DOCUMENTS 10,390,034 B2 * 8/2019 Zhu ..................... H04N 19/167
2011/0255598 A1 10/2011 Lin
(Continued)

FOREIGN PATENT DOCUMENTS

CN 101064849 A 10/2007
EP 3152906 A1 4/2017
(Continued)

OTHER PUBLICATIONS

Rapaka, et al., "Improved intra block copy and motion search methods for screen content coding", Proceedings of SPIE—International Society for Optical Engineering, US, vol. 9599, Sep. 22, 2015, pp. 95991D, XP060060838, ISSN: 0277-786X, DOI: 10.1117/12.2193685, ISBN: 978-1-62841-730-2, section 2.1.
(Continued)

*Primary Examiner* — Chikaodili E Anyikire
(74) *Attorney, Agent, or Firm* — Canon U.S.A., Inc. IP Division

(57) ABSTRACT

The present invention concerns a method and a device for encoding or decoding blocks of pixels in the process of encoding or decoding a video. It concerns more particularly methods to handle parallelization when using INTRA Block Copy mode of HEVC Screen Content extension. It is based on the control of the area available for providing predictor blocks in INTRA Block Copy mode.
Accordingly, the implementation is simple in order to allow parallelized process.

13 Claims, 14 Drawing Sheets

(51) Int. Cl.
    *H04N 19/156*     (2014.01)
    *H04N 19/105*     (2014.01)
    *H04N 19/174*     (2014.01)
    *H04N 19/436*     (2014.01)
    *H04N 19/96*     (2014.01)

(52) U.S. Cl.
    CPC ......... *H04N 19/174* (2014.11); *H04N 19/176* (2014.11); *H04N 19/436* (2014.11); *H04N 19/96* (2014.11)

(56) References Cited

U.S. PATENT DOCUMENTS

| | | | |
|---|---|---|---|
| 2012/0082238 | A1 | 4/2012 | Panusopone et al. |
| 2013/0121417 | A1 | 5/2013 | Chong et al. |
| 2013/0182774 | A1 | 7/2013 | Wang et al. |
| 2013/0272370 | A1 | 10/2013 | Coban et al. |
| 2015/0271517 | A1* | 9/2015 | Pang .................. H04N 19/57 375/240.02 |
| 2017/0094271 | A1* | 3/2017 | Liu ..................... H04N 19/436 |
| 2017/0238001 | A1* | 8/2017 | Li ...................... H04N 19/96 375/240.12 |
| 2018/0014011 | A1* | 1/2018 | He ...................... H04N 19/176 |

FOREIGN PATENT DOCUMENTS

| | | |
|---|---|---|
| EP | 3160144 A1 | 4/2017 |
| EP | 3202150 A1 | 8/2017 |
| RU | 2350040 C1 | 3/2009 |
| WO | 2012/008608 A1 | 1/2012 |
| WO | 2016/004850 A1 | 1/2016 |

OTHER PUBLICATIONS

Figure 2:
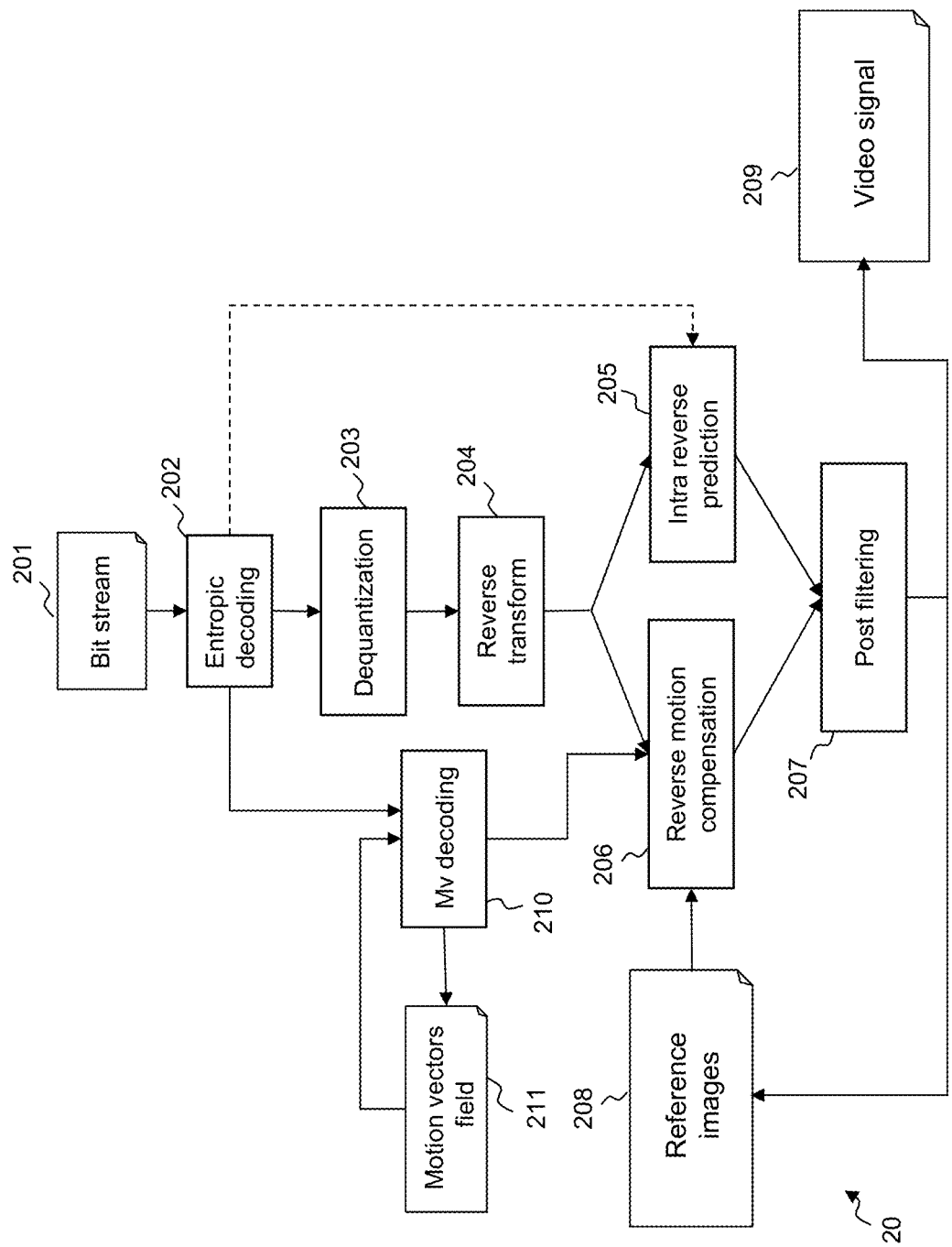

Kwon, et al., "Fast intra block copy (IntraBC) search for HEVC screen content coding", 2014 IEEE International Symposium on Circuits and Systems (I SCAS), IEEE, Jun. 1, 2014 (Jun. 1, 2014), pp. 9-12, XP032624581, DOI: 10.1109/ISCAS.2014.6865052 [retrieved on Jul. 24, 2014] section I, figure 2.

Clare, et al., "Wavefront Parallel Processing for HEVC Encoding and Decoding", Joint Collaborative Team on Video Coding (JCT-VC) of ITU-T SG16 WP3 and ISO/IEC JTC1/SC29/WG 11, 6th Meeting: Torino, IT, Jul. 14-22, 201 I, URL:http://wftp3.itu.int/av-arch/jctvc-site/, No. JCTV-F274, Jan. 1, 2011, XP030009297, * sections 3-5 *; figures 2,3.

Balle, et al., "Extended Texture Prediction for H.264/AVC Intra Coding", Extended Texture Prediction for H.264/AVC Intra Coding, Sep. 1, 2007, pp. 93-96, XP008155518, DOI: 10.1109/ICIP.2007. 4379529 Retrieved from the Internet: URL:http://ieeexplore.ieee.org/stamp/stamp.jsp?tp=&arnumber=4379529, section 2, figure 1(b).

Yu, et al., "New Intra Prediction using Intra-Macroblock Motion Compensation", 3. JVT Meeting, MPEG Meeting, Jun. 5, 2002-Oct. 5, 2002; Fairfax,US, (Joint Video Team of ISO/IEC JTC1/SC291WG11 and ITU-T SG.16 ), No. JVT-C151rf.doc, May 10, 2002, XP030005267, ISSN: 0000-0442, section 1.

Pang, et al., "Non-RCE3: 2-D MV Supported Intra Motion Compensation",14. JCT-VC Meeting, Jul. 25, 2013-Aug. 2, 2013, Vienna, (Joint Collaborative Team on Video Coding of !SO/IEC JTC1/SC29/WG11 and ITU-T SG.16 ) ; URL:http://wftp3.itu.int/av-arch/jctvc-site/, No. JCTVC-N0256, Jul. 16, 2013, XP030114776, sections 2 and 4.

Lai, et al., "Description of screen content coding technology proposal by MediaTek", 17. JCT-VC Meeting; Mar. 27, 2014-Apr. 4, 2014, Valencia, (Joint Collaborative Team on Video Coding of ISO/IEC JTC1/SC29/WG11 and ITU-T SG.16 ), URL:http://wftp3.itu.int/av-arch/jctvc-site/, No. JCTVC-Q0033-v4, Mar. 26, 2014, XP030115920, section 2.7.1.

Sullivan, et al., "Overview of the High Efficiency Video Coding (HEVC) Standard", IEEE Transactions on Circuits and Systems for Video Technology, Jan. 1, 2012, pp. 1-1, XP055045358, SSN: 1051-8215, DOI:10.1109/TCSVT.2012.2221191, section II.C, last paragraph of section IV.F.

Chi, et al., "Parallel Scalability and Efficiency of HEVC Parallelization Approaches", IEEE Transactions on Circuits and Systems for Video Technology, IEEE Service Center, Piscataway, NJ, US, vol. 22, No. 12, Dec. 1, 2012, pp. 1827-1838, XP011487165, ISSN: 1051-8215, DOI:10.1109/TCSVT.2012.2223056, section II.B.2, section IV.B.

Laroche, et al., "AHG14: On IBC constraint for Wavefront Parallel Processing", 19. JCT-VC Meeting, Oct. 17, 2014-Oct. 24, 2014; Strasbourg, (Joint Collaborative Team on Video Coding of ISO/IEC JTC1/SC291WG11 and ITU-T SG.16 ), URL:http://wftp3.itu.int/av-arch/jctvc-site/, No. JCTVC-S0070, Oct. 7, 2014, XP030116810, the whole document.

Lai, et al., "AHG14: Intra Block Copy reference area for Wavefront Parallel Procsssing (WPP)", 19. JCT-VC Meeting; Oct. 17, 2014-Oct. 24, 2014; Strasbourg, (Joint Collaborative Team on Video Coding of JSO/IEC JTC1/SC291WG11 and JTU-T SG.16 ), URL:http://wft3.jtu.jnt/av-arch/jctvc-site/,, No. JCTVC-S0101, Oct. 8, 2014, XP030116850, sections 2 and 3.

Li, et al., "On WPP with palette mode and intra BC mode", 19. JCT-VC Meeting, Oct. 17, 2014-Oct. 24, 2014, Strasbourg, (Joint Collaborative Team on Video Coding of ISO/JEC JTC1/SC29/WG11 and ITU-T SG.16 ), URL:http://wftp3.jtu.jnt/av-arch/jctvc-site/, No. JCTVC-S0088, Oct. 7, 2014, XP030116832, sections 2.2 and 6.

Gordon Clare, et al, Wavefront Parallel Processing for HEVC Encoding and Decoding, Joint Collaborative Team on Video Coding (JCT-VC) of ITU-T SG16 WP3 and ISO/IEC JTC1/SC291WG11, 6th Meeting, No. JCTVC-F274 m20694, Torino, IT, Jul. 14-22, 2011, pp. 1-19.

Madhukar Budagavi, Intra motion compensation and entropy coding improvements for HEVC screen content coding, 2013 Picture Coding Symposium (PCS), IEEE, pp. 365-368.

\* cited by examiner

| 1 | 2 | 3 | 5 | 7 | 10 | 13 | 17 | ... |
|---|---|---|---|---|----|----|----|-----|
| 4 | 6 | 8 | 11 | 14 | 18 | ... | | |
| 9 | 12 | 15 | 19 | ... | | | | |
| 16 | 20 | ... | | | | | | |
| | | | | | | | | |
| | | | | | | | | |

Fig. 13

METHOD AND APPARATUS FOR VECTOR ENCODING IN VIDEO CODING AND DECODING

CROSS-REFERENCE TO RELATED APPLICATIONS

The application is the National Phase application of PCT Application No. PCT/EP2015/073060, filed on Oct. 6, 2015 and titled "Method And Apparatus For Vector Encoding In Video Coding And Decoding". This application claims the benefit under 35 .S.C. § 119(a)-(d) of United Kingdom Patent Application No. 1417634.1, filed on Oct. 6, 2014 and titled "Method And Apparatus For Vector Encoding In Video Coding And Decoding". The above cited patent application is incorporated herein by reference in its entirety.

The present invention concerns a method and a device for encoding or decoding blocks of pixels in the process of encoding or decoding a video. It concerns more particularly methods to handle parallelization when using INTRA Block Copy mode of HEVC Screen Content extension. It is based on the control of the area available for providing predictor blocks in INTRA Block Copy mode.

It applies more particularly to a mode of coding where a block of pixel is predictively encoded based on a predictor block pertaining to the same image. This mode of encoding a block of pixel is generally referred to as INTRA Block Copy mode. It is considered as a tool candidate for the Screen content Extension of the High Efficiency Video Coding (HEVC: ISO/IEC 23008-2 MPEG-H Part 2/ITU-T H.265) international standard and now in the Screen Content extension of the same.

When encoding an image in a video sequence, the image is first divided into coding elements that are entities of pixels of equal size referred to as Coding Tree Block (Coding Tree Block). The size of a Coding Tree Block is typically 64 by 64 pixels. Each Coding Tree Block may then be decomposed in a hierarchical tree of smaller blocks which size may vary and which are the actual blocks to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residual. Next, this residual is compressed. The actual encoded information of the Coding Unit is made of some information to indicate the way of determining the predictor block and the compressed residual. Best predictor blocks are blocks as similar as possible to the Coding Unit in order to get a small residual that could be efficiently compressed.

Encoding may be lossy, meaning that information is lost in the encoding process. The decoded block of pixel is not exactly the same as the original Coding Unit. Typically, the loss of information comes from a quantization applied to the residual before entropy coding. This quantization allows a higher compression rate at the price of the loss of accuracy. Typically, high frequencies, namely the high level of details, are removed in the block.

Encoding may be lossless, meaning that the residual is not quantized. This kind of encoding allows retrieving the exact copy of the original samples of the Coding Unit. The lossless encoding is obtained at the expense of compression rate which is much smaller compared to a lossy compression.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residual.

We focus in this document on a third coding mode called INTRA Block Copy mode. According to the INTRA Block Copy mode, the block predictor is an actual block of the current image. A block vector is used to locate the predictor block. This block vector gives the location in the current image of the predictor block relatively to the location of the Coding Unit in the same current image. It comes that this block vector shares some similarities with the motion vector of the INTER mode. It is sometime called motion vector by analogy. As there could not be a motion within an image, strictly speaking, and for the sake of clarity, in this document motion vector always refer to the INTER mode while block vector is used for the INTRA Block Copy mode.

The causal principle is the principle that states that all information to decode a particular Coding Unit must be based on already reconstructed Coding Units. At encoding, the whole information may be considered as available. Namely, to encode a given Coding Unit it would be possible to use any information from the entire current images or from all decoded and available other images in the sequence. At decoding, things are different. The decoding of the current images is typically done by decoding sequentially all Coding Unit. The order of decoding follows typically a raster scan order, namely beginning in the upper left of the image, progressing from left to right and from top to bottom. It come that when decoding a given Coding Unit, only the part of the current image located up or left to the current Coding Unit has already been decoded. This is the only available information for the decoding of the current Coding Unit. This has to be taken into account at encoding. For example, a predictor block in INTRA Block Copy mode, should pertain to the part of the image that will be available at decoding.

At decoding, to retrieve a block encoded using INTRA Block Copy mode, first of all, the predictor block is determined using the block vector. Then the residual is decoded and applied to the predictor to obtain a raw reconstructed block.

When the complete image has been reconstructed, some post filtering is applied. Typically a first filter is applied to remove some artefacts in the reconstructed image due to the block encoding. This filter is called the deblocking filter. Typically, while not mandatory, a sample adaptive loop filter (SAO) is then applied to get the final image.

in some decoding architecture, the processing is parallelized in order to speed up the process. In this situation, a particular coding tree block is reconstructed while the previous one is filtered for example. Namely, reconstruction of some coding tree block and filtering of others are made in parallel.

The HEVC standard offers some high level of parallelism as Wavefront or Tiles or Slices for frame parallelism and flexible reference frames management for Inter parallelism. These tools are not mandatory, yet, the decoder needs to decode their related syntax even if they are not mandatory.

We focus in this document to the Wavefront parallel processing and how it be efficiently combined with the INTRA Block Copy mode of encoding a particular Coding Unit.

The Wavefront parallel processing is based on parallelizing the reconstruction of lines of Coding Tree blocks. Namely, a number of Coding Tree Blocks are reconstructed in parallel. A delay is introduced between the treatment of each line due to the fact that the reconstruction of a subsequent line of Coding Tree Blocks needs some information from the previous line. It means that the reconstruction of the different lines being parallelized is going on with a delay between each line.

This Wavefront parallel processing may prove to have a problem when reconstructing a particular coding unit encoded according to INTRA Block Copy mode. Actually, the block predictor for a coding unit encoded according to INTRA Block Copy mode may be located anywhere in the complete causal area, namely the previous Coding Tree Block lines and the previous Coding Tree Blocks in the current line. As the previous lines are reconstructed in parallel with the considered one, it may happen that the predictor block has not yet been reconstructed at the time it is needed for the reconstruction of the coding unit encoded according to INTRA Block Copy mode. As such INTRA Block Copy mode is not fully compatible with Wavefront parallel reconstruction.

The present invention has been devised to address one or more of the foregoing concerns.

According to a first aspect of the present invention, there is provided a method of encoding an image, the image comprising a plurality of Coding Tree blocks made of blocks of pixels, each block of pixels being encoded according to a mode out of a plurality of modes, one such mode being a mode in which the block is encoded based on a predictor block being a block of the current image, the method comprising: determining the search area for said one mode as an area constituted by any reconstructed blocks of the current Coding Tree block and Coding Tree blocks having coordinates (X, Y) where:

$$Y \leq Y_0 \text{ and } (X-X_0) \leq -(Y-Y_0)$$

where X represents the horizontal coordinate, Y represents the vertical one, the origin being in the top left corner of the image, and $(X_0, Y_0)$ are the coordinates of the current Coding Tree block.

In an embodiment encoding is performed using Wavefront parallel processing.

In a second aspect of the present invention, there is provided a method of decoding an image, the image comprising a plurality of Coding Tree blocks made of blocks of pixels, each block of pixels being encoded according to a mode out of a plurality of modes, one such mode being a mode in which the block is decoded based on a predictor block being a block of the current image, the method comprising: restricting the area from which said predictor block may be obtained for said one mode to an area constituted by any reconstructed blocks of the current Coding Tree block and Coding Tree blocks having coordinates (X, Y) where:

$$Y \leq Y_0 \text{ and } (X-X_0) \leq -(Y-Y_0)$$

where X represents the horizontal coordinate, Y represents the vertical one, the origin being in the top left corner of the image, and $(X_0, Y_0)$ are the coordinates of the current Coding Tree block.

In an embodiment the decoding is performed using Wavefront parallel processing.

In a third aspect of the present invention, there is provided a device for encoding an image, the image comprising a plurality of Coding Tree blocks made of blocks of pixels, each block of pixels being encoded according to a mode out of a plurality of modes, one such mode being a mode in which the block is encoded based on a predictor block being a block of the current image, the device comprising: means for determining the search area for said one mode as an area constituted by any reconstructed blocks of the current Coding Tree block and Coding Tree blocks having coordinates (X, Y) where:

$$Y \leq Y_0 \text{ and } (X-X_0) \leq -(Y-Y_0)$$

where X represents the horizontal coordinate, Y represents the vertical one, the origin being in the top left corner of the image, and $(X_0, Y_0)$ are the coordinates of the current Coding Tree block.

In a fourth aspect of the present invention, there is provided a device for decoding an image, the image comprising a plurality of Coding Tree blocks made of blocks of pixels, each block of pixels being decoded according to a mode out of a plurality of modes, one such mode being a mode in which the block is decoded based on a predictor block being a block of the current image, the device comprising: means for restricting the area from which said predictor block may be obtained to an area constituted by the reconstructed blocks of the current Coding Tree block and the Coding Tree blocks of coordinates (X, Y) where:

$$Y \leq Y_0 \text{ and } (X-X_0) \leq -(Y-Y_0)$$

where X represents the horizontal coordinate, Y represents the vertical one, the origin being in the top left corner of the image, and $(X_0, Y_0)$ are the coordinates of the current Coding Tree block. For example, restricting the area may take the form of not performing (e.g. stopping) the decoding process if the area from which a predictor block is to be obtained is found to be outside of the area constituted by the reconstructed blocks of the current Coding Tree block and the Coding Tree blocks of coordinates (X, Y) where:

$$Y \leq Y_0 \text{ and } (X-X_0) \leq -(Y-Y_0)$$

where X represents the horizontal coordinate, Y represents the vertical one, the origin being in the top left corner of the image, and $(X_0, Y_0)$ are the coordinates of the current Coding Tree block.

In a fifth aspect of the present invention, there is provided a system for encoding and decoding an image, the system comprising a device for encoding an image according to the preceding encoder aspects and a device for decoding an image according to the preceding decoder aspects.

The device for encoding and the device for decoding may be configured to use Wavefront parallel processing.

The device for encoding and the device for decoding may be configured to use the same number of synchronized threads for respectively encoding and decoding the image.

According to a sixth aspect of the present invention, there is provided a bitstream comprising encoded images, wherein encoded images have been encoded according to the preceding encoding aspects.

According to a seventh aspect of the present invention, there is provided a bitstream comprising an encoded sequence of images the images each comprising a plurality of Coding Tree blocks made of blocks of pixels, each block of pixels having been encoded according to a mode out of a plurality of modes, one mode being a mode in which the block is encoded based on a predictor block being a block of the current image, wherein the position of any predictor block indicated by the bitstream is restricted to an area constituted by any reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical one, the origin being in the top left corner of an encoded image, and $(X_0, Y_0)$ are the coordinates of the current Coding Tree block.

According to an eighth aspect of the present invention, there is provided a machine readable carrier or storage medium having stored thereon a bitstream according to the preceding bitstream aspects. The carrier may also be a signal on which said bitstream is embodied.

According to a ninth aspect of the present invention, there is provided a computer program product for a programmable apparatus, the computer program product comprising a sequence of instructions for implementing a method according to any of the preceding method aspects, when loaded into and executed by the programmable apparatus.

According to a tenth aspect of the present invention, there is provided a computer-readable storage medium storing instructions of a computer program for implementing a method according to any one of the preceding method aspects.

According to a further aspect of the invention, there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the method comprising: determining the search range for INTRA Block Copy mode as the area constituted by the Coding Tree blocks of coordinates (X, Y) such as:

$Y \leq Y_0$ and $X \leq X_0$ where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

Accordingly, the implementation is simple in order to allow the Wavefront process.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the method comprising: determining the search range for INTRA Block Copy mode as the area constituted by the Coding Tree blocks of coordinates (X, Y) such as:

$Y \leq Y_0$ and $(X-X_0) \leq -(Y-Y_0)$ where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

Accordingly, the search area is bigger, which leads to a better encoding.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the method comprising: determining the search range for INTRA Block Copy mode as the area constituted by the Coding Tree blocks of coordinates (X, Y) such as:

$Y \leq Y_0$ and $(X-X_0) \leq -2*(Y-Y_0)$ where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

Accordingly, the search area is bigger, which leads to a better encoding.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the method comprising: determining the search range for INTRA Block Copy mode as the area constituted by the Coding Tree blocks of coordinates (X, Y) such as:

$Y \leq Y_0$ and $(X-X_0) \leq -2*(Y-Y_0)$ where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

Accordingly, implementation is simpler.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the method comprising: determining the search range for INTRA Block Copy mode as the area constituted by the Coding Tree blocks of coordinates (X, Y) such as:

$X \leq X_0$ and $Y=Y_0$ where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the encoding being carried on by a plurality of parallel threads of encoding, each threads being dedicated to the encoding of a line of Coding Tree blocks, the method comprising: determining the search range for INTRA Block Copy mode as the area constituted by, for a current INTRA Block Copy block, all data reconstructed by all threads of the previous Coding Tree Block lines and the current Coding Tree Block line.

According to another aspect of the invention there is provided a method of encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the encoding being carried on by a plurality of synchronized parallel threads of encoding, each threads being dedicated to the encoding of a line of Coding Tree blocks, the method comprising: determining the search range for INTRA Block Copy mode as the area constituted by, for a current INTRA Block Copy block, all data reconstructed by all threads (including the current Coding Tree Block).

In an embodiment encoding is done according to Wavefront parallelized mode.

According to another aspect of the invention there is provided a method of decoding an image, the image comprising a plurality of Coding Tree blocks made of blocks of pixels, each block of pixels being decoded according to a mode out of a plurality of modes, one mode being called INTRA Block Copy mode in which the block is encoded based on a predictor block being an actual block of the current image, the decoding being carried on by a plurality parallel threads of decoding, each threads being dedicated to the decoding of a line of Coding Tree blocks, wherein said plurality of threads are synchronized.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the device comprising: means for determining the search range for INTRA Block Copy mode as the area constituted by the Coding Tree blocks of coordinates (X, Y) such as:

$$Y \leq Y_0 \text{ and } X \leq X_0$$

where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the device comprising: means for determining the search range for INTRA Block Copy mode as the area constituted by the Coding Tree blocks of coordinates (X, Y) such as:

$$Y \leq Y_0 \text{ and } (X-X_0) \leq -(Y-Y_0)$$

where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the device comprising: means for determining the search range for INTRA Block Copy mode as the area constituted by the Coding Tree blocks of coordinates (X, Y) such as:

$$Y \leq Y_0 \text{ and } (X-X_0) \leq -2*(Y-Y_0)$$

where X represents the horizontal coordinate, Y represents the vertical one, the origin being in the bottom left corner of the image, and where $(X_0, Y_0)$ are the coordinates of the current Coding Tree block, plus the reconstructed blocks of the current Coding Tree block.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the device comprising: means for determining the search range for INTRA Block Copy mode as the area constituted by the Coding Tree blocks of coordinates (X, Y) such as:

$$Y \leq Y_0 \text{ and } (X-X_0) \leq -2*(Y-Y_0)$$

where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the device comprising: means for determining the search range for INTRA Block Copy mode as the area constituted by the Coding Tree blocks of coordinates (X, Y) such as:

$$X \leq X_0 \text{ and } Y = Y_0$$

where X represents the horizontal coordinate, Y represents the vertical one, the origin being in the top left corner of the image, and where $(X_0, Y_0)$ are the coordinates of the current Coding Tree block, plus the reconstructed blocks of the current Coding Tree block.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the encoding being carried on by a plurality of parallel threads of encoding, each threads being dedicated to the encoding of a line of Coding Tree blocks, the device comprising means for determining the search range for INTRA Block Copy mode as the area constituted by, for a current INTRA Block Copy block, all data reconstructed by all threads of the previous Coding Tree Block lines and the current Coding Tree Block line.

According to another aspect of the invention there is provided a device for encoding an image, the image comprising a plurality of Coding Tree blocks made of blocks of pixels, each block of pixels being encoded according to a mode out of a plurality of modes, one mode being called INTRA Block Copy mode in which the block is encoded based on a predictor block being an actual block of the current image, the encoding being carried on by a plurality of synchronized parallel threads of encoding, each thread being dedicated to the encoding of a line of Coding Tree blocks, the device comprising: means for determining the search range for INTRA Block Copy mode as the area constituted by, for a current INTRA Block Copy block, all data reconstructed by all threads.

According to another aspect of the invention there is provided a device for decoding an image, the image comprising a plurality of Coding Tree blocks made of blocks of pixels, each block of pixels being decoded according to a mode out of a plurality of modes, one mode being called INTRA Block Copy mode in which the block is encoded based on a predictor block being an actual block of the current image, the device comprising: means for processing a plurality of parallel threads of decoding, each thread being dedicated to the decoding of a line of Coding Tree blocks; and wherein synchronization means for synchronizing said plurality of threads.

According to another aspect of the invention there is provided a system for encoding and decoding an image, the system comprising an encoder according to the invention and a decoder according to the invention.

In an embodiment, the encoder and the decoder are using the same number of synchronized threads for respectively encoding and decoding the image.

According to another aspect of the invention there is provided a bitstream comprising encoded images, wherein encoded images have been encoded according to the invention.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

Some aspects of the invention recited above mention the mode of the plurality of modes being an Intra block copy mode, however, as will be appreciated, this is merely an arbitrary label for this mode and is not intended to be limited. Accordingly, those aspects have within their intended scope any mode in which a block is encoded (or decoded) based on a predictor block being an actual block of the current image being encoded (or decoded) whether that mode is referred to as an Intra block copy mode or otherwise.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Figure 1:
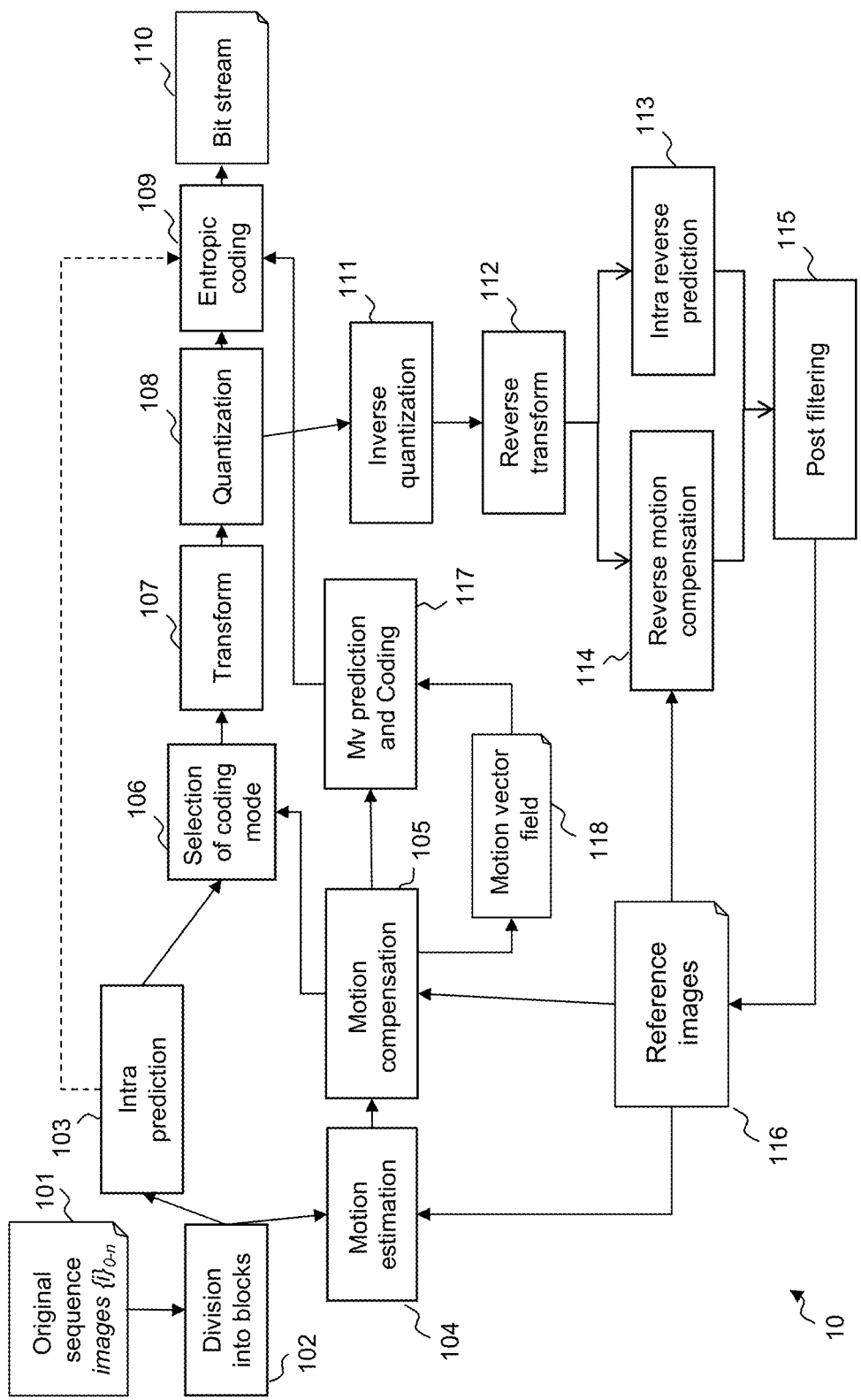
Figure 3:
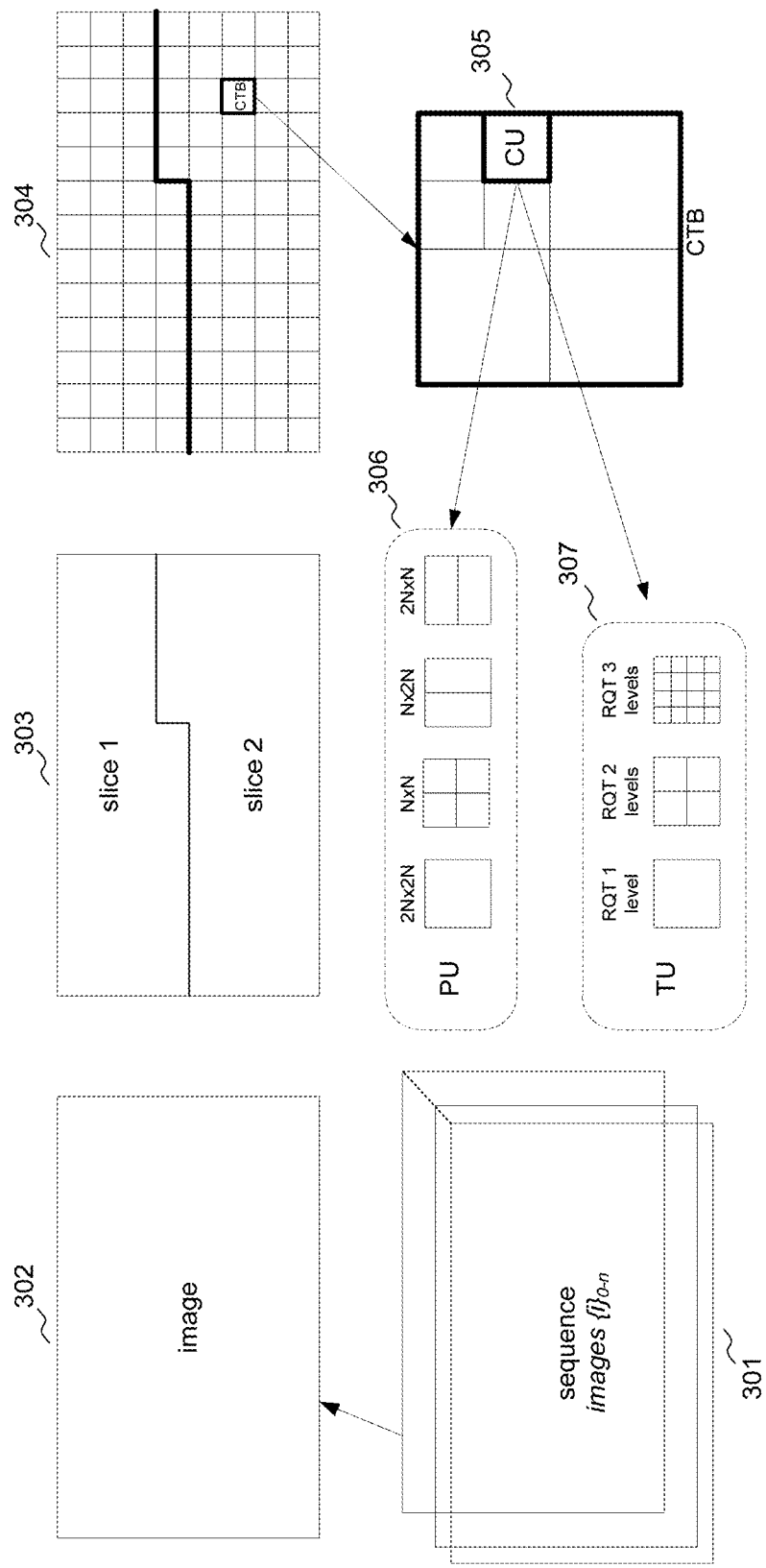
Figure 4:
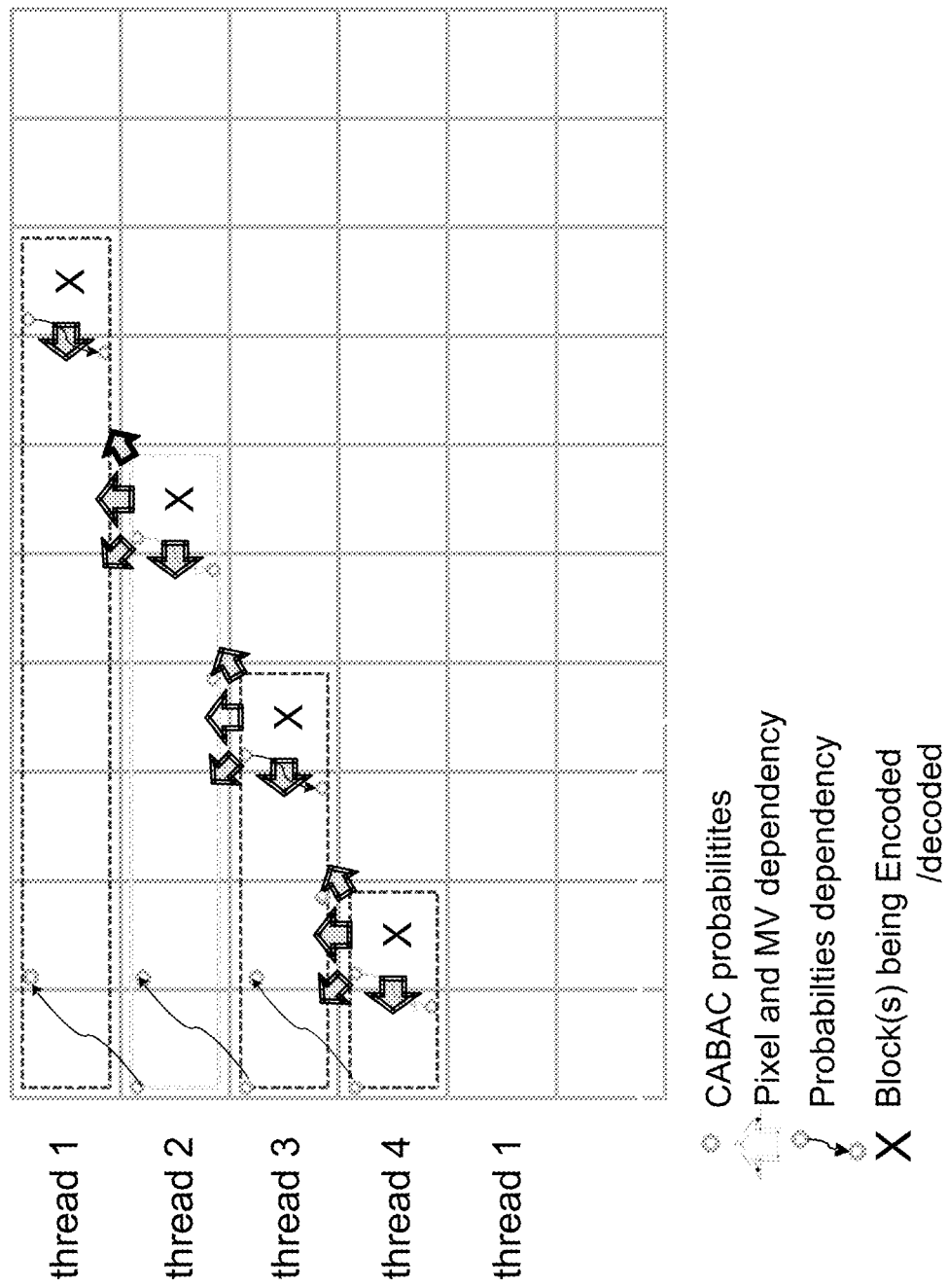
Figure 5:
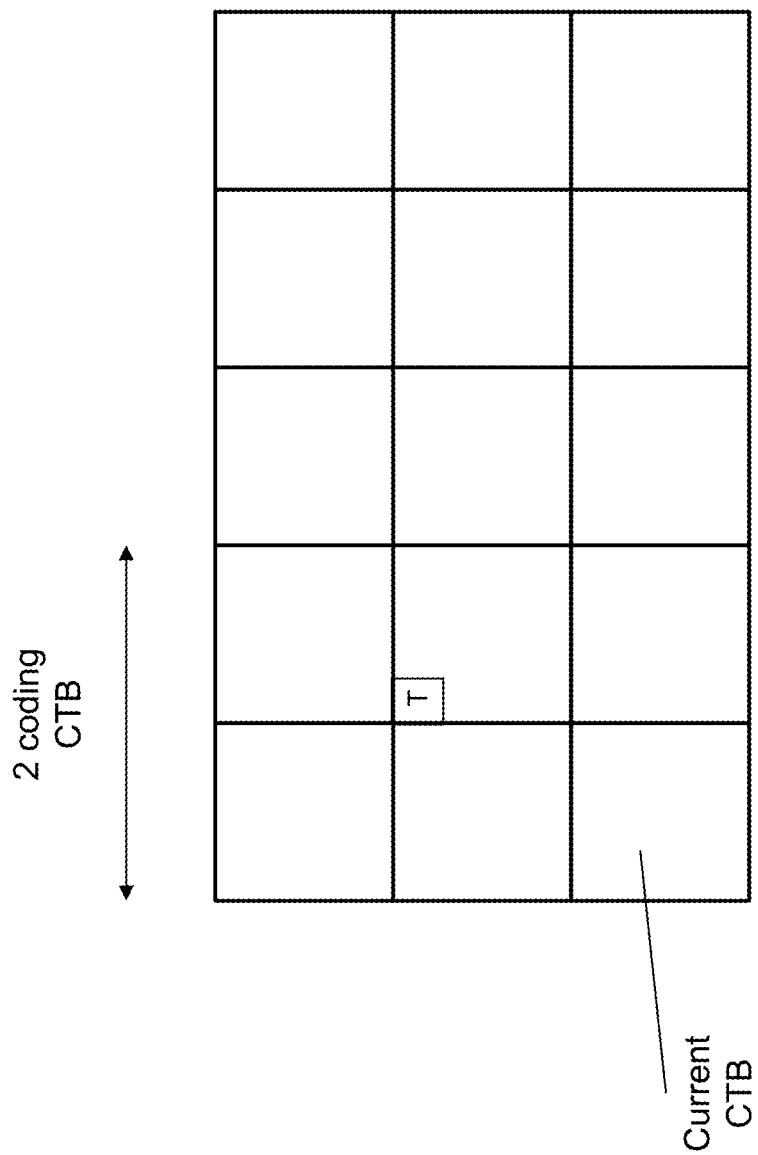
Figure 6:
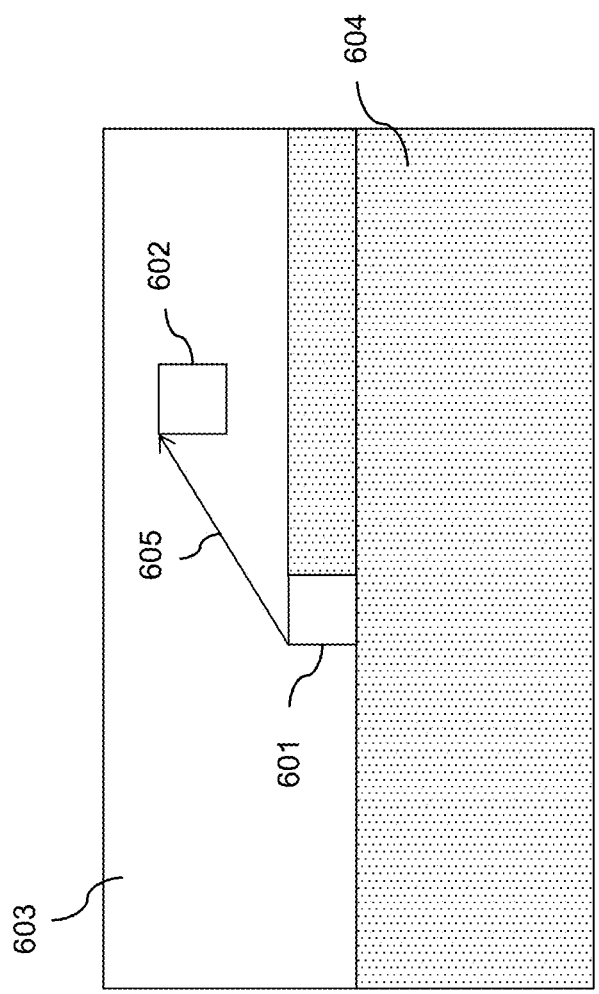
Figure 7:
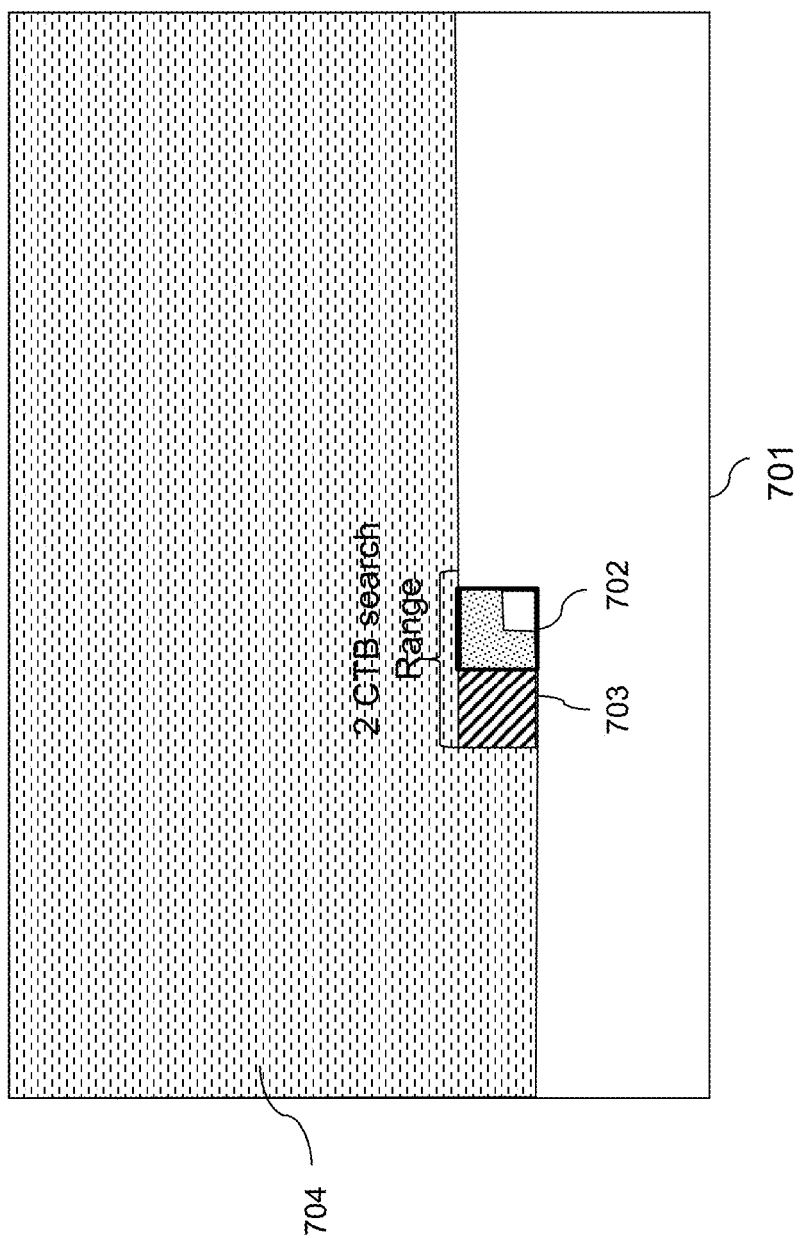
Figure 8:
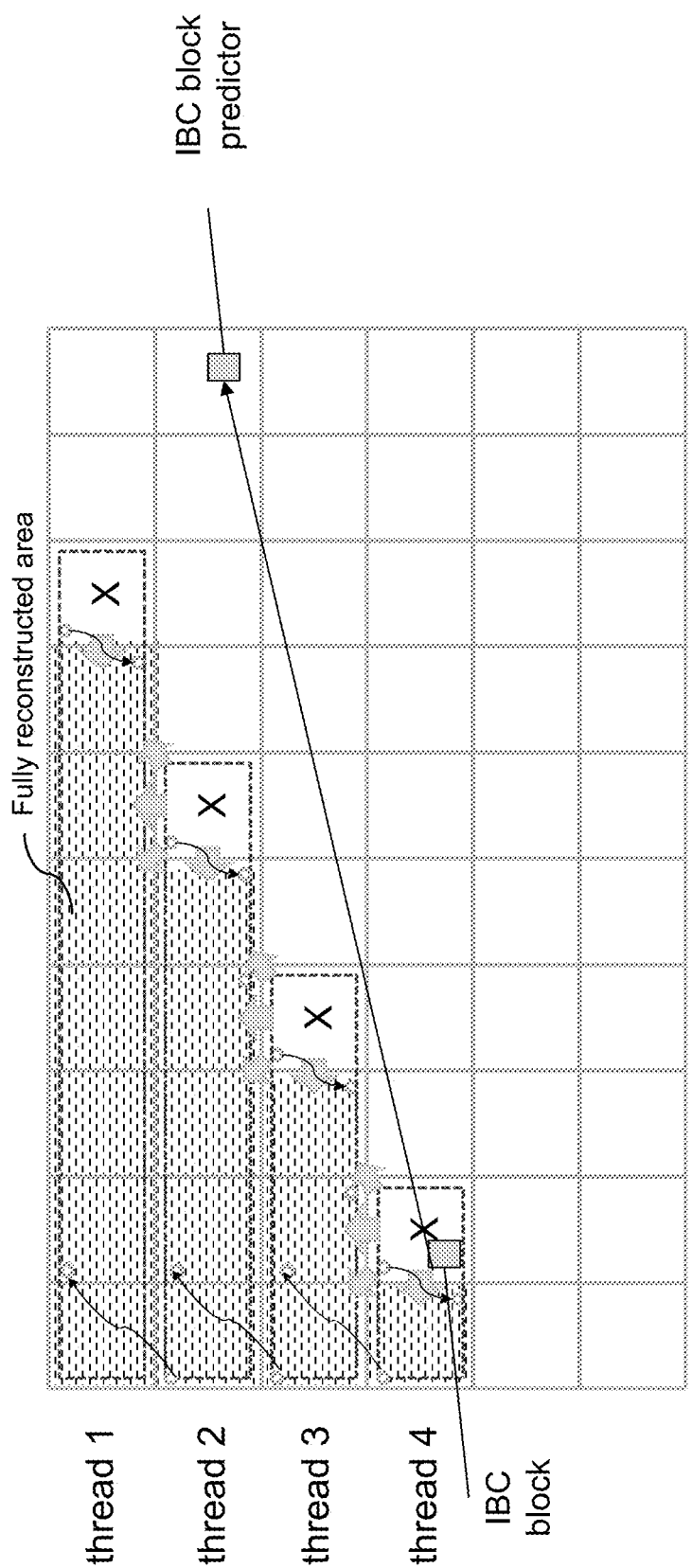
Figure 9:
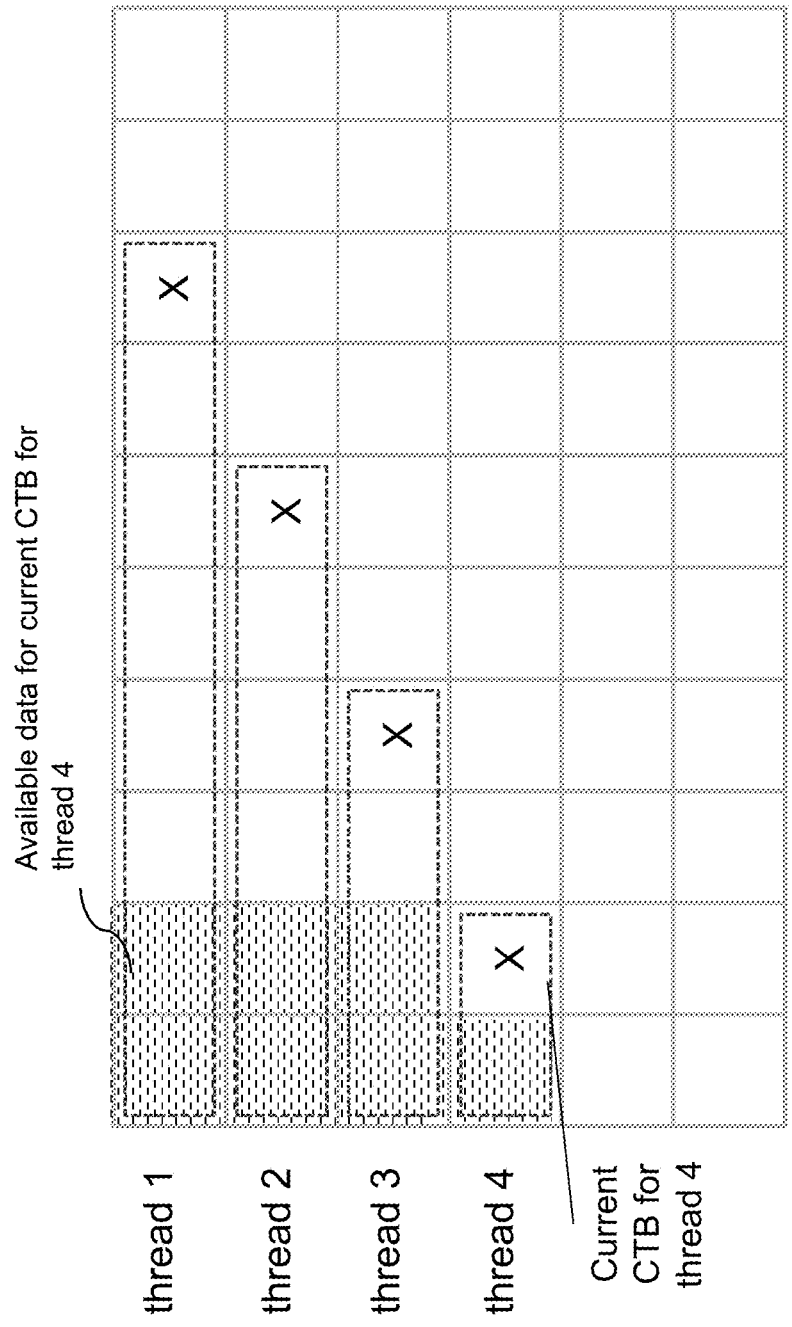
Figure 10:
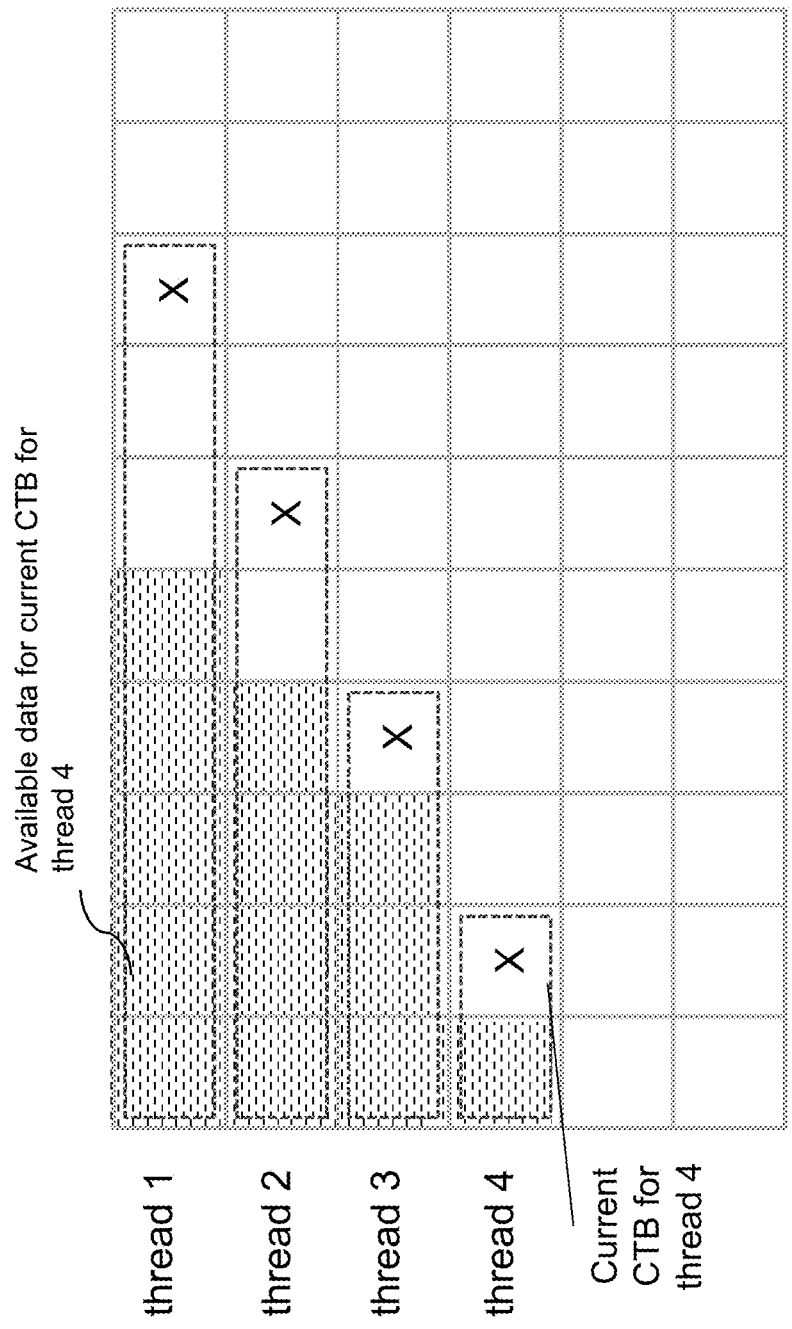
Figure 11:
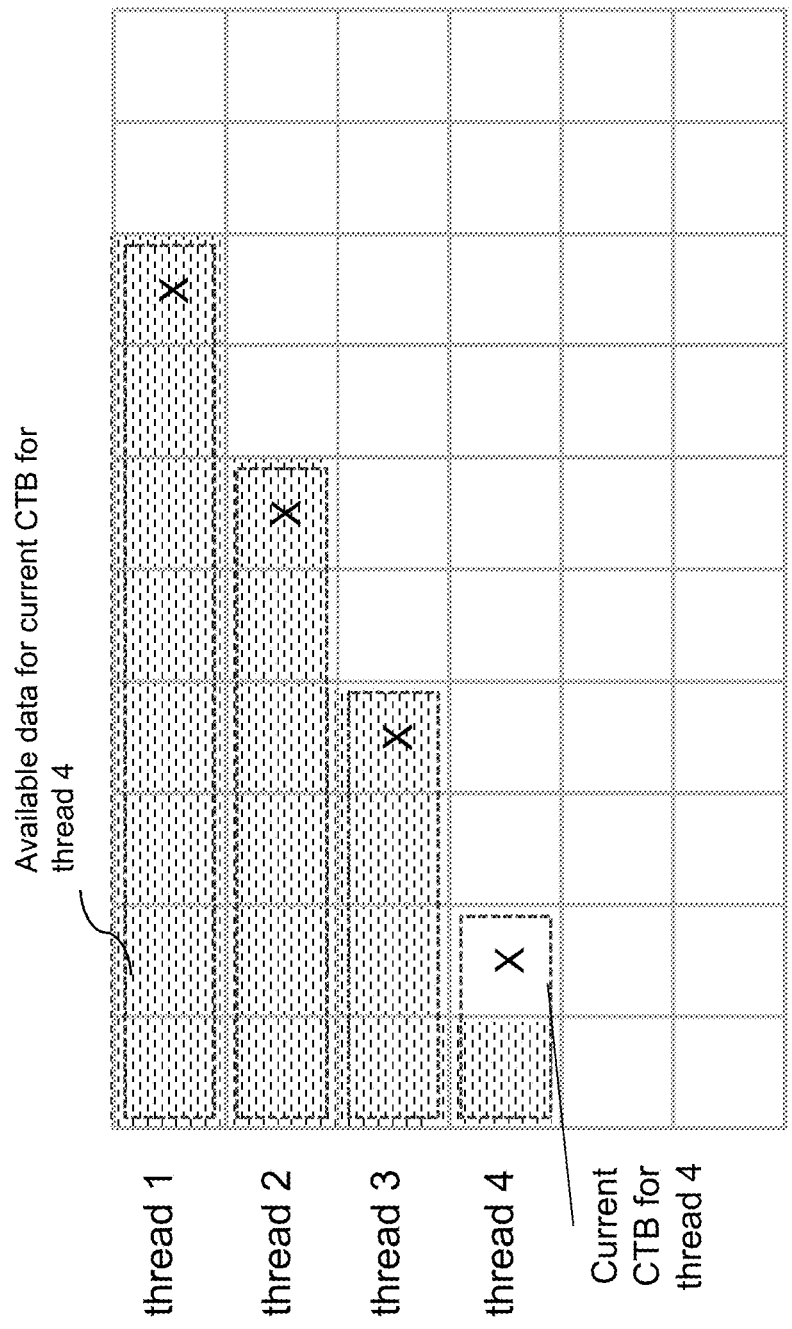
Figure 12:
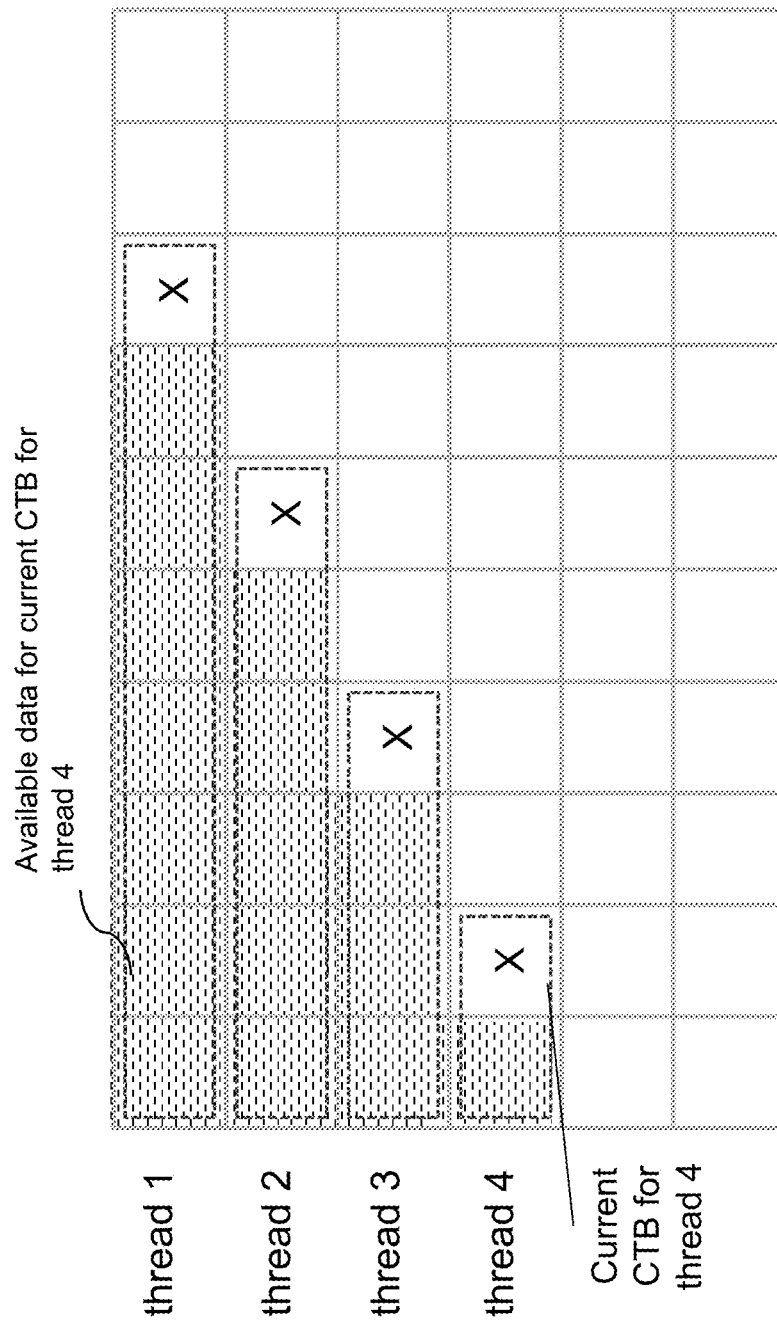
Figure 14:
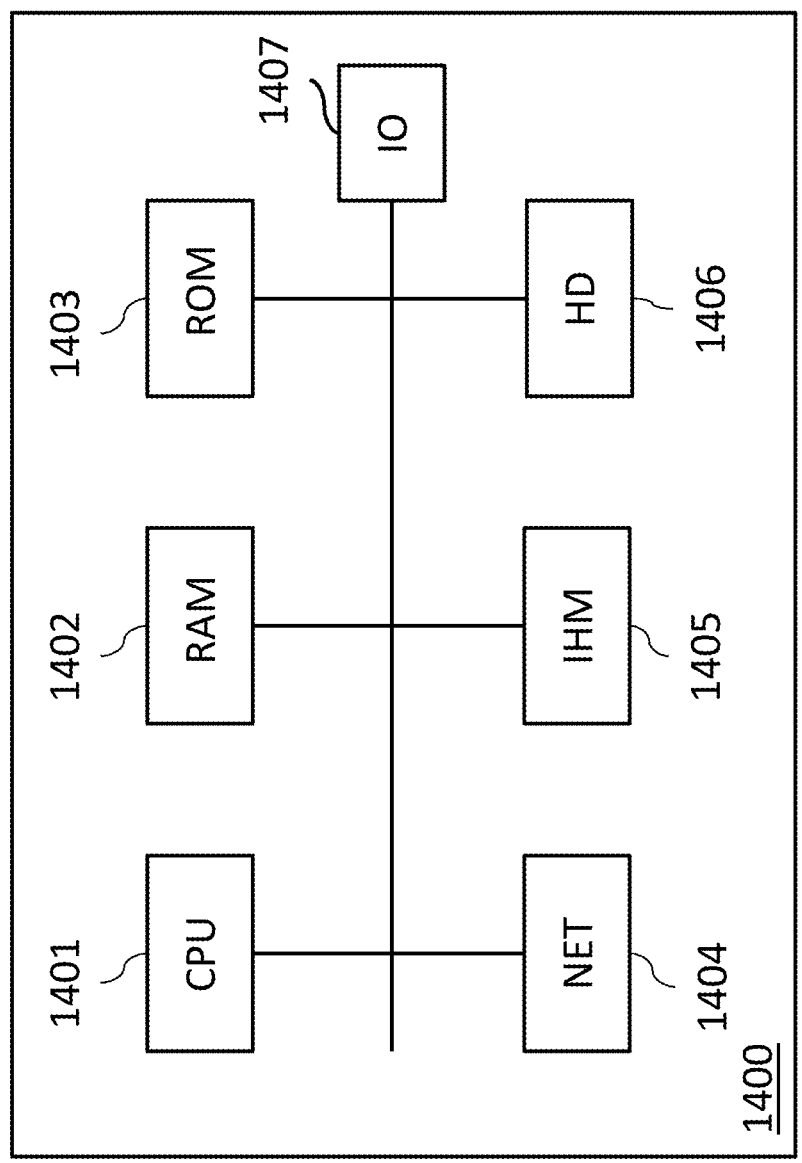

Embodiments of the invention will now be described, by way of example only, and with reference to the following drawings in which:

FIG. 1 illustrates the HEVC encoder architecture;
FIG. 2 illustrates the HEVC decoder architecture;
FIG. 3 illustrates the Level decomposition of Video frame;
FIG. 4 illustrates the principle of Wavefront processing;
FIG. 5 illustrates the location of block for the initialization of context variable with Wavefront;
FIG. 6 illustrates the concept of the causal area;
FIG. 7 illustrates the INTRA Block Copy search area;
FIG. 8 illustrates a problem solved by the invention;
FIG. 9 illustrates one embodiment of the invention;
FIG. 10 illustrates one embodiment of the invention;
FIG. 11 illustrates one embodiment of the invention;
FIG. 12 illustrates one embodiment of the invention;
FIG. 13 illustrates one embodiment of the invention; and
FIG. 14 is a schematic block diagram of a computing device for implementation of one or more embodiments of the invention.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction.

Temporal prediction first consists in finding in a previous or future frame called the reference frame 116 the reference area that most closely matches the Coding Unit in a motion estimation step 104. This reference area constitutes the predictor block. Next this Coding Unit is predicted using the predictor block to compute the residual in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the encoded and decoded loop. It means that they need to be applied on the reconstructed frame at encoder and decoder side in order to use the same reference frame at encoder and decoder side. The aim of this post filtering is to remove compression artifacts.

In FIG. 2, have been represented the principle of a decoder. The video stream 201 is first entropy decoded in a module 202. The residual data are then inverse quantized in a module 203 and inverse transformed in a module 204 to obtain pixel values. The mode data are also entropy decoded in function of the mode, an INTRA type decoding or an INTER type decoding is performed. In the case of INTRA mode, an INTRA predictor is determined in function of the INTRA prediction mode specified in the bitstream 205. If the mode is INTER, the motion information is extracted from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

This INTRA Block Copy coding mode is particularly well suited for extremely repetitive patterns. In particular, it is known to help coding graphical elements such as glyphs, the graphical representation of a character, or traditional GUI elements, which are very difficult to code using traditional INTRA prediction methods.

It is worth noting that prediction is based on coherence between neighboring Coding Units. This coherence may be geographic when considered within the current frame or temporal when considered across successive frames. This kind of coherence occurs in natural images. As INTRA Block Copy encoding mode is seen as a mode dedicated to text or symbolic images, predication is thought as useless for this kind of image. For instance, there is no reason to have two successive Coding Units in an image representing a text having good predictors close to each other. The first Coding Unit may be the part of letter "A", a good predictor block would therefore come from another "A" in the text. While the next Coding Unit would be a "P" letter having a predictor block from another "P" in the text. There is no reason, a-priori, to have the two predictor blocks in the same neighborhood. This is why prior art does not contemplate introducing prediction in INTRA Block Copy encoding mode.

In HEVC, it is possible to transmit specific NAL Units, called SEI messages of different types. SEI messages contain information related to the display process, and are therefore optional.

FIG. 3 shows the coding structure used in HEVC. According to HEVC and one of its previous predecessors, the original video sequence 301 is a succession of digital images "images i". As is known by those skilled in the art, a digital image is represented by one or more matrices the coefficients of which represent pixels.

The images 302 are divided into slices 303. A slice is a part of the image or the entire image. In HEVC these slices are divided into non-overlapping Coding Tree Blocks (CTB) 304, generally blocks of size 64 pixels×64 pixels. Each Coding Tree Block may in its turn be iteratively divided into smaller variable size Coding Units (CUs) 305 using quadtree decomposition. Coding units are the elementary coding elements and are constituted of two sub units which Prediction Unit (PU) and Transform Units (TU) of maximum size equal to the Coding Unit's size. Prediction Unit corresponds to the partition of the Coding Unit for prediction of pixels values. Each Coding Unit can be further partitioned into a maximum of 4 square Partition Units or 2 rectangular Partition Units 306. Transform units are used to represent the elementary units that are spatially transform with DCT. A Coding Unit can be partitioned in TU based on a quadtree representation 307.

Each slice is embedded in one NAL unit. In addition, the coding parameters of the video sequence are stored in dedicated NAL units called parameter sets. In HEVC and H.264/AVC two kinds of parameter sets NAL units are employed: first, the Sequence Parameter Set (SPS) NAL unit that gathers all parameters that are unchanged during the whole video sequence. Typically, it handles the coding profile, the size of the video frames and other parameters. Secondly, Picture Parameter Sets (PPS) codes the different values that may change from one frame to another. HEVC include also Video Parameter Set (VPS) which contains parameters describing the overall structure of the stream.

For real time or fast implementation, it is often needed to parallelize some encoding and decoding processes. The HEVC standard offers some high level of parallelism as Wavefront or Tiles or Slices for frame parallelism and flexible reference frames management for Inter parallelism. These tools are not mandatory, yet, the decoder needs to decode their related syntax even if they are not mandatory.

The invention is dedicated to the Wavefront processing when it is combined with the INTRA Block Copy tools of the Screen Content extension of HEVC. The principle of Wavefront processing is presented in FIG. 4. The principle is to parallelize the decoding process of several lines of Coding Tree Block. In opposite to the Tiles or in classical Slices, which avoid some predictions to offer parallelism but generate some losses in coding efficiency, the Wavefront keeps a large majority of predictions. The Wavefront introduces a delay between each line for the parallelization. In the example of FIG. 4, 4 threads are run in parallel. So, 4 current Coding Tree Block are decoded in parallel. There is a delay between threads; for example, the second stream needs some information decoded by the first thread. So it is run with a delay of one Coding Tree Block for the entropy decoding. In the same way, thread 3 needs some decoded information from thread 2 etc. . . . . . If we consider that the parsing and the reconstruction of each Coding Tree Block is exactly the same, the delay should be at decoder of 2 Coding Tree Block as it is represented in FIG. 4. Indeed for reconstruction, the top right Coding Unit of the top right Coding Tree Block could be needed to decode the current Coding Tree Block. So in order to prevent a thread from waiting for its previous thread, a 2 Coding Tree Blocks delay should be considered.

In the HEVC standard, the Wavefront processing is not explicitly defined. Only some CABAC resettings are explicitly described. When the flag entropy_coding_sync_enabled_flag is enabled, and when the first pixel of the first Coding Tree Block of a Coding Tree Block line is decoded, the context variable of the CABAC are initialized with the spatial neighbouring block T as depicted in FIG. 5. More precisely the context variable of the CABAC takes the same values as those of block T. This block is the first block of the top right Coding Tree Block. If this block T is not available the context variables are initialized as the first Coding Tree Block of a frame.

So, for the HEVC Wavefront only the CABAC dependencies for the first block of each Coding Tree Block differ from the classical decoding process. For the classical decoding process, the values of the context variables of the first Coding Tree Block of Coding Tree Block line is set equal to the values of the context variables of the last block of the last Coding Tree Block of the previous Coding Tree Block line. When Wavefront is enable, this variable context are initialized with those of the top right Coding Tree Block (T). This is the only change that is needed at decoder side to use Wavefront at both encoder and decoder.

Moreover, it is possible to reset the context variables CABAC as the first Coding Tree Block of a frame according to some entry point syntax elements. Yet, these specific entry points are not needed for the current solution.

The Screen Content Coding extension of HEVC under definition contains additional tools to efficiently code screen coding sequences. The current added tools are the Intra block copy mode, the Palette mode and the residual color transform. The current invention is dedicated to the Intra block copy mode only, so only this mode is described in the following.

Yet, please note that the Palette mode and the INTRA Block Copy mode are new Intra modes and consequently added to the modules 103 and 205 of respectively FIGS. 1 and 2.

The Intra Block Copy (IBC) was added as an additional mode for Screen content coding extension of HEVC. This prediction method is particularly well suited for extremely repetitive patterns. In particular, it is known to help coding graphical elements such as glyphs (i.e., the graphical representation of a character) or traditional GUI elements, which are very difficult to code using traditional intra prediction methods.

FIG. 6 illustrates how this Intra Block Copy prediction mode works.

At a high-level, an image is divided into Coding Units that are encoded in raster scan order. Thus, when coding block 601, all the blocks of area 603 have already been encoded/decoded, and can be considered available to the encoder/decoder. Area 603 is called the causal area of the Coding Unit 601. Once Coding Unit 601 is encoded/decoded, it will belong to the causal area for the next Coding Unit. This next Coding Unit, as well as all the next ones, belongs to area 604 illustrated as doted area, and cannot be used for coding the current Coding Unit 601. It is worth noting that the causal area is constituted by raw reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

INTRA Block Copy works by signaling a block 602 in the causal area which should be used to produce a prediction of block 601. For example, the block 602 may be found by using a matching algorithm. In the HEVC Screen content Extension, this block is indicated by a block vector 605, and the residual of this vector according to a predictor is transmitted in the bitstream.

The INTRA Block Copy predictor comes from all the reconstructed causal area of the current frame. As for other Intra modes, the causal area is not loop filtered.

This block vector is the difference in coordinates between a particular point of the Coding Unit 601 and the equivalent point in the predictor block 602. Although it would be possible to use subpixel accuracy as for INTER blocks, this displacement is typically in integer units of pixels, therefore not to require costly subpixel interpolation.

In the current INTRA Block Copy design, each INTRA Block Copy Coding Unit can be split into one or 2 PUs as depicted in FIG. 3. For the smallest Coding Unit size, 8×8, the Coding Unit can be also split into 4 PUs of 4×4 pixels each.

For Inter mode the N×N partition is not available. It means that the 4×4 block size can't be used for Inter mode. The following table summarizes the block size for both modes.

| Block sizes | IBC mode | Inter mode |
| --- | --- | --- |
| 64 × 64 (2N × 2N) | X | X |
| 64 × 32 (2N × N) | X | X |
| 32 × 64 (N × 2N) | X | X |
| 32 × 32 (2N × 2N) | X | X |
| 32 × 16 (2N × N) | X | X |
| 16 × 32 (N × 2N) | X | X |
| 16 × 16 (2N × 2N) | X | X |
| 16 × 8 (2N × N) | X | X |
| 8 × 16 (N × 2N) | X | X |
| 8 × 8 (2N × 2N) | X | X |

-continued

| Block sizes | IBC mode | Inter mode |
|---|---|---|
| 8 × 4 (2N × N) | X | X |
| 4 × 8 (N × 2N) | X | X |
| 4 × 4 (N × N) | X | |

In the current implementation of Intra Block Copy prediction mode, the search area at encoder side depends on the blocks sizes. This is represented in the following table:

| Block size | Full range search (outside the 2CTB area) | 2 CTBs range search | Other |
|---|---|---|---|
| 64 × 64 | | | No search |
| 32 × 32 | | | No search |
| 16 × 16 | Classical IBC search | Classical IBC search | |
| 8 × 8 | Hash-based | Classical IBC search | |
| 4 × 8 | | Classical IBC search | |
| 8 × 4 | | Classical IBC search | |
| 4 × 4 | | Classical IBC search | |

Please note that the 2N×N and N×2N PU sizes are tested only for 8×8 Coding Units in the current encoder implementation. These sizes are not depicted in this table. There are 2 types of Intra Block Copy block vector estimation. The first one is the classical INTRA Block Copy search and it corresponds to a dedicated block matching algorithm. The second one is based on the Hash search algorithm. Two search ranges are also defined.

As depicted in FIG. 7, for a frame 701, the two Coding Tree Blocks search range corresponds to the left Coding Tree Block 703 and to the blocks of the current Coding Tree Block 702 already encoded/decoded. The blocks of current Coding Tree Block already encoded are depicted in dotted area in FIG. 7. The full frame search corresponds to all the Coding Tree Blocks already encoded/decoded 704.

In the Intra Block Copy mode the "block" vector is the difference in coordinates between a particular point in a block 601 to encode and the equivalent point in the predictor block 602 of FIG. 6. Although it would be possible to use subpixel accuracy as for INTER blocks, this displacement is in integer units of pixels, therefore it doesn't require costly subpixel interpolation.

This block vector (BV) is itself predicted using a predictor which can be the left, the above BV or the latest decoded block vector of the current Coding Tree Block or the latest of the latest decoded BV. This vector predictors come of course from the decoded Intra Block Copy block. With these methods a predictor index is transmitted.

As mentioned previously, INTRA Block Copy is an Intra mode so its predictors come from the raw reconstructed data before any loop filtering. As a consequence, the decoder implementations using Wavefront processing should be decreased in decoding. Indeed as depicted in FIG. 8, an INTRA Block Copy block predictor can come from a Coding Tree Block which has not been reconstructed. So, it means that the decoder can fully wait for the decoding process of this INTRA Block Copy predictor. So by considering the worst case, which is that each first block of each Coding Tree Block line points to the last block of each previous Coding Tree Block line, the decoding process with Wavefront can't be significantly faster than the classical decoding.

In a first embodiment of the invention, for a current Coding Tree Block, the INTRA Block Copy search range is limited to all left, top left and top Coding Tree Blocks and of course the reconstructed blocks of the current Coding Tree Block. The INTRA Block Copy search range is the area in the image where a predictor block may be searched for the encoding of a given coding unit according to INTRA Block Copy mode. It means that the top right Coding Tree Block are considered as unavailable for INTRA Block Copy prediction at encoder side and consequently no INTRA Block Copy block predictor for the current Coding Tree Block can point to any top Right Coding Tree Block at decoder side. FIG. 9 shows this embodiment for the current Coding Tree Block of thread 4.

Namely the search range for INTRA Block Copy mode is determined as the area constituted by the Coding Tree Blocks of coordinates (X, Y) such that:

$Y \leq Y_0$ and $X \leq X_0$ where X represents the horizontal coordinate, Y represents the vertical one, the origin being in the top left corner of the image, and where $(X_0, Y_0)$ are the coordinates of the current Coding Tree Block. Naturally, for the current Coding Tree Block, the area contains only already reconstructed blocks.

This solution is very simple in term of implementation and simplifies significantly the Wavefront process.

In other embodiments, in order to improve the coding efficiency, more reconstructed blocks are available for INTRA Block Copy prediction or a current Coding Tree Block.

In one embodiment, all Coding Tree Blocks (CTBs) located to the left of a diagonal that starts at top right of the current Coding Tree Block and finishes at the top edge of the image are available for the INTRA Block Copy prediction. The mentioned diagonal follows a stepped (i.e. ladder shaped) path that follows a line that travels one CTB in the positive direction along the x-axis followed by one CTB in the negative direction along the y-axis and so on until the line reaches the top edge of the image. In addition, any already reconstructed CTBs of the current CTB row (thread) and any reconstructed blocks of the current CTB are also available for the INTRA Block Copy prediction. FIG. 10 shows this embodiment for the current Coding Tree Block of the $4^{th}$ thread. At decoder side the INTRA Block Copy predictors for the current Coding Tree Block come from this area only. It corresponds to an encoder using one Coding Tree Block delay between threads.

Namely, in this embodiment, the search range for INTRA Block Copy mode as the area constituted by the Coding Tree blocks of coordinates (X, Y) such that:

$Y \leq Y_0$ and $(X - X_0) \leq -(Y - Y_0)$.

In another embodiment, all Coding Tree Block left to the diagonal with a delay of 2 Coding Tree Block are available for INTRA Block Copy prediction in addition to the reconstructed blocks of the current Coding Tree Block. FIG. 11 shows this embodiment for the current Coding Tree Block of the $4^{th}$ thread.

Namely, in this embodiment, the search range for INTRA Block Copy mode as the area constituted by the Coding Tree blocks of coordinates (X, Y) such that:

$Y \leq Y_0$ and $(X - X_0) \leq -2*(Y - Y_0)$

This embodiment increases the coding efficiency compared to the first one, but as shown in FIG. 11, potentially this search range increase the delay between thread.

In another embodiment, all Coding Tree Block left to the diagonal with a delay of 1 Coding tree block for the previous Coding Tree Block line and 2 Coding Tree Block all other previous Coding Tree Block lines are available for INTRA Block Copy prediction in addition to the reconstructed blocks of the current Coding Tree Block. FIG. 12 shows this embodiment for the current Coding Tree Block of the 4$^{th}$ thread. It corresponds to a decoder which decodes the frame with 2 Coding Tree Block delays between threads in order to have the reconstructed top right Coding Unit available to decode the current Coding Tree Block. This area is more dedicated to decoder Wavefront processing.

Namely, in this embodiment, the search range for INTRA Block Copy mode as the area constituted by the Coding Tree blocks of coordinates (X, Y) such that:

$Y \leq Y_0$ and $(X-X_0) < -2*(Y-Y_0)$

In one embodiment, each INTRA Block Copy block of a thread can access only the blocks reconstructed by this same thread. It corresponds to the use of a Coding Tree Block line search area for INTRA Block Copy at encoder side. This embodiment offers a flexible decoding for Wavefront processing. Indeed, there are no additional dependencies between Coding Tree Block lines compared to an implementation without INTRA Block Copy but it reduces the coding efficiency.

Namely, in this embodiment, the search range for INTRA Block Copy mode as the area constituted by the Coding Tree blocks of coordinates (X, Y) such that:

$X \leq X_0$ and $Y=Y_0$.

In a particular embodiment, when the Wavefront is enabled, both encoder and decoder use the wavefront parallelism with the required number of threads. Moreover for this embodiment, the threads are synchronized. It means that each thread, before starting the decoding of the following Coding Tree Block, waits for the decoding end of all Coding Tree Block of the other threads. In that case, at encoder and decoder, the reconstruction of all blocks is synchronized at Coding Tree Block level. In this embodiment, an INTRA Block Copy block of a thread can access all reconstructed Coding Tree Block available, even if the Coding Tree Block is in the below Coding Tree Block lines. For example, in FIG. 12 each INTRA Block Copy block of each decoded Coding Tree Block (marked by an X) can access all available data of thread 4 in the classical implementation. In addition, each block of a Coding Tree Block can access all reconstructed blocks of its own Coding Tree Block. The advantage of this embodiment is that it increases the average number of blocks for each Coding Tree Block and it increases the search area for the first Coding Tree Block line for which the bitrate is generally higher due to the lack of possible predictions compared to other following Coding Tree Block lines. Please note that in this embodiment, a mono-threaded decoder can obtain the same decoding results than multithreaded decoder. Indeed, only the Coding Tree Block synchronization is mandatory.

Figure 13:
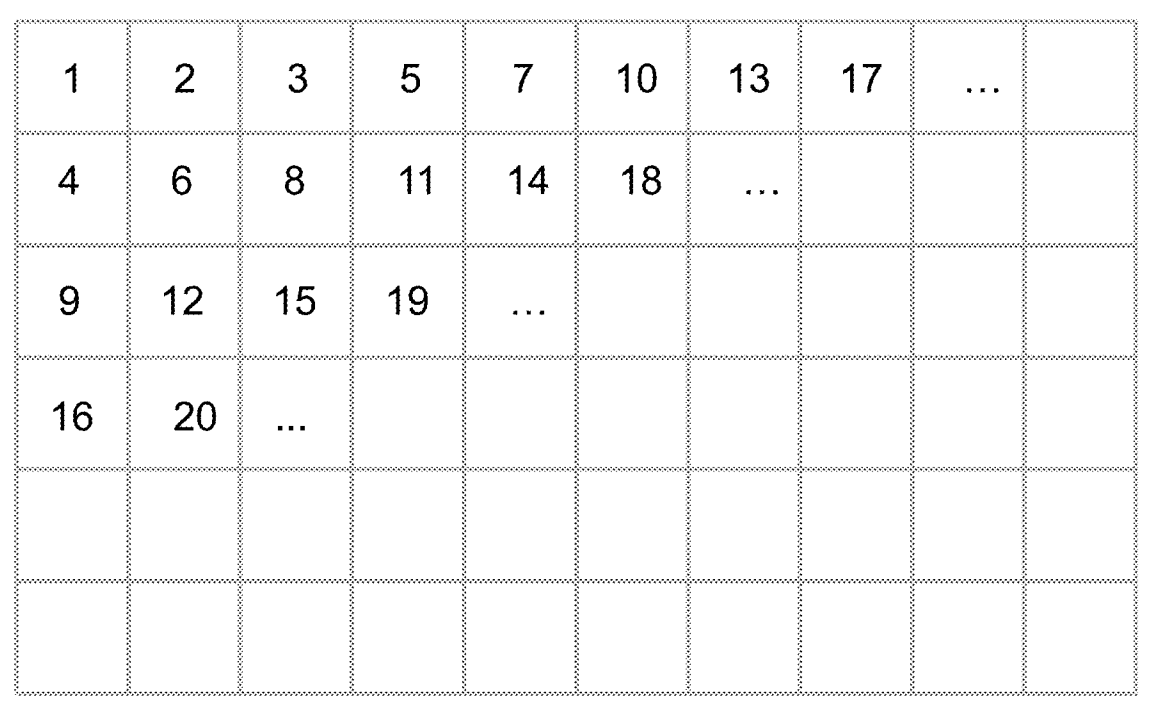

FIG. 13 shows the decoding order of CTB when a mono-threaded decoder implementation is used for a 2 CTB delay. Another order is needed if the delay considered is 1 CTB.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus connected to:
- a central processing unit 1401, such as a microprocessor, denoted CPU;
- a random access memory 1402, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 1403, denoted ROM, for storing computer programs for implementing embodiments of the invention;
- a network interface 1404 is typically connected to a communication network over which digital data to be processed are transmitted or received. The network interface 1404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1401;
- a user interface 1405 may be used for receiving inputs from a user or to display information to a user;
- a hard disk 1406 denoted HD may be provided as a mass storage device;
- an I/O module 1407 may be used for receiving/sending data from/to external devices such as a video source or display.

The executable code may be stored either in read only memory 1403, on the hard disk 1406 or on a removable digital medium such as for example a disk. According to a variant, the executable code of the programs can be received by means of a communication network, via the network interface 1404, in order to be stored in one of the storage means of the communication device 1400, such as the hard disk 1406, before being executed.

The central processing unit 1401 is adapted to control and direct the execution of the instructions or portions of software code of the program or programs according to embodiments of the invention, which instructions are stored in one of the aforementioned storage means. After powering on, the CPU 1401 is capable of executing instructions from main RAM memory 1402 relating to a software application after those instructions have been loaded from the program ROM 1403 or the hard-disc (HD) 1406 for example. Such a software application, when executed by the CPU 1401, causes the steps of the flowcharts described herein to be performed.

Any step of the algorithm described herein may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding an image, the image comprising a plurality of Coding Tree blocks made of blocks of pixels, each block of pixels being encoded according to a mode out of a plurality of modes, one such mode being a mode in which the block is encoded based on a predictor block being a block of the image, the method comprising:
   obtaining a predictor block for said one mode from a restricted area constituted by any reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical coordinate, an origin being in the top left corner of the image, and $(X_0, Y_0)$ are the coordinates of the current Coding Tree block, Coding Tree blocks having coordinates (X, Y) not satisfying $Y \leq Y_0$ and $(X-X_0) \leq -(Y-Y_0)$ being outside said restricted area; and
   encoding said image using the obtained predictor block.

2. The method of claim 1, wherein said encoding is performed using Wavefront parallel processing.

3. A method of decoding an image, the image comprising a plurality of Coding Tree blocks made of blocks of pixels, each block of pixels being decoded according to a mode out of a plurality of modes, one such mode being a mode in which the block is decoded based on a predictor block being a block of the image, the method comprising: obtaining a predictor block for said one mode from a restricted area constituted by any reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical coordinate, an origin being in the top left corner of the image, and $(X_0, Y_0)$ are the coordinates of the current Coding Tree block, Coding Tree blocks having coordinates (X, Y) not satisfying $Y \leq Y_0$ and $(X-X_0) \leq -(Y-Y_0)$ being outside said restricted area; and
   decoding the image using the obtained predictor block.

4. The method of decoding according to claim 3, wherein said decoding is performed using Wavefront parallel processing.

5. A device for encoding an image, the image comprising a plurality of Coding Tree blocks made of blocks of pixels, each block of pixels being encoded according to a mode out of a plurality of modes, one such mode being a mode in which the block is encoded based on a predictor block being a block of the image, the device comprising:
   an obtaining unit which obtains a predictor block for said one mode from a restricted area constituted by any reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical coordinate, an origin being in the top left corner of the image, and $(X_0, Y_0)$ are the coordinates of the current Coding Tree block, Coding Tree blocks having coordinates (X, Y) not satisfying $Y \leq Y_0$ and $(X-X_0) \leq -(Y-Y_0)$ being outside said restricted area; and
   a processing unit which encodes the image using the obtained predictor block.

6. A device for decoding an image, the image comprising a plurality of Coding Tree blocks made of blocks of pixels, each block of pixels being decoded according to a mode out of a plurality of modes, one such mode being a mode in which the block is decoded based on a predictor block being a block of the image, the device comprising:
   an obtaining unit which obtains a predictor block for said one mode from a restricted area constituted by the reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical one, the origin being in the top left corner of the image, and $(X_0, Y_0)$ are the coordinates of the current Coding Tree block, Coding Tree blocks having coordinates (X, Y) not satisfying $Y \leq Y_0$ and $(X-X_0) \leq -(Y-Y_0)$ being outside said restricted area; and
   a processing unit which decodes the image using the obtained predictor block.

7. A system for encoding and decoding an image, the system comprising:
   a device for encoding an image, the image comprising a plurality of Coding Tree blocks made of blocks of pixels, each block of pixels being encoded according to a mode out of a plurality of modes, one such mode being a mode in which the block is encoded based on a predictor block being a block of the image, the device comprising:
   an obtaining unit which obtains a predictor block for said one mode from a restricted area constituted by any reconstructed blocks of the current Coding Tree block and Coding Tree blocks having coordinates (X, Y) where:

$Y \leq Y_0$ and $(X-X_0) \leq -(Y-Y_0)$ where X represents the horizontal coordinate, Y represents the vertical coordinate, an origin being in the top left corner of the image, and $(X_0, Y_0)$ are the coordinates of the current Coding Tree block, Coding Tree blocks having coordinates (X, Y) not satisfying $Y \leq Y_0$ and $(X-X_0) \leq -(Y-Y_0)$ being outside said restricted area; and
   a processing unit which encodes the image using the obtained predictor block, and
   a device for decoding an image, the image comprising a plurality of Coding Tree blocks made of blocks of pixels, each block of pixels being decoded according to a mode out of a plurality of modes, one such mode being a mode in which the block is decoded based on a predictor block being a block of the image, the device comprising: an obtaining unit which obtains a predictor block for said one mode from a restricted area constituted by the reconstructed blocks of the current Coding Tree block and the Coding Tree blocks of coordinates (X, Y) where:

$$Y \leq Y_0 \text{ and } (X-X_0) \leq -(Y-Y_0)$$

where X represents the horizontal coordinate, Y represents the vertical coordinate, an origin being in the top left corner of the image, and $(X_0, Y_0)$ are the coordinates of the current Coding Tree block, Coding Tree blocks having coordinates (X, Y) not satisfying $$Y \leq Y_0 \text{ and } (X-X_0) \leq -(Y-Y_0)$$

being outside said restricted area; and
    a processing unit which decodes the image using the obtained predictor block.

8. The system of claim 7, wherein at least one of the device for encoding and the device for decoding is configured to use Wavefront parallel processing.

9. The system of claim 8, wherein device for encoding and the device for decoding are configured to use the same number of synchronized threads for respectively encoding and decoding the image.

10. A non-transitory computer-readable storage medium, on which is stored a sequence of instructions for executing a method of encoding an image according to claim 1.

11. A non-transitory computer-readable storage medium, on which is stored a sequence of instructions for executing a method of decoding an image according to claim 3.

12. A non-transitory computer-readable storage medium, on which is stored a sequence of instructions for executing a method of encoding an image according to claim 2.

13. A non-transitory computer-readable storage medium, on which is stored a sequence of instructions for executing a method of decoding an image according to claim 4.

* * * * *